No. 736,269. PATENTED AUG. 11, 1903.
E. H. B. KNOWLTON.
LOAD RETAINING OR RELEASING MEANS FOR VEHICLES.
APPLICATION FILED SEPT. 11, 1902.
NO MODEL.
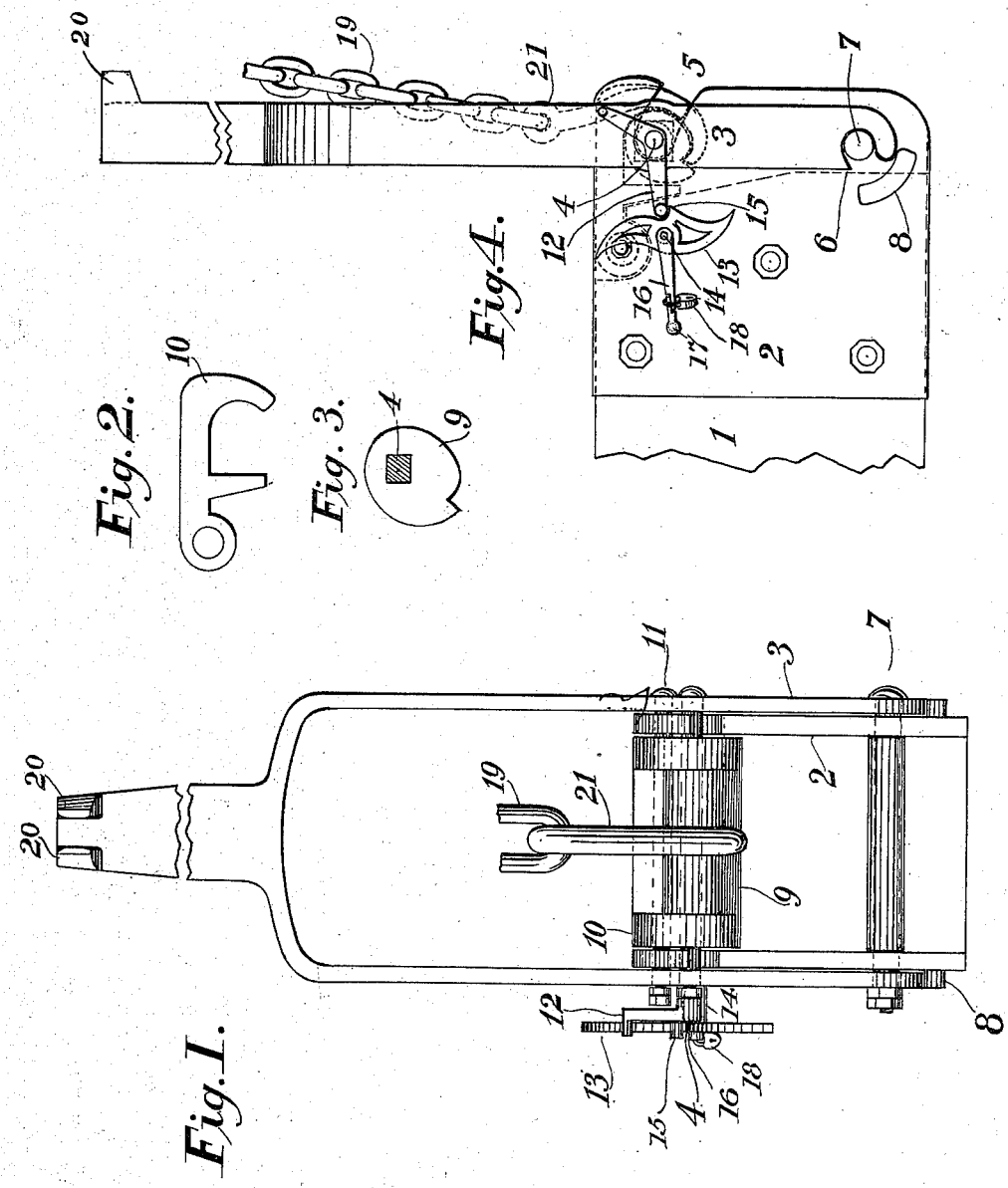
Witnesses
Inventor
Ephriam H. B. Knowlton
By James T. Watson
his Attorney No. 736,269. Patented August 11, 1903.

UNITED STATES PATENT OFFICE.

EPHRIAM H. B. KNOWLTON, OF SUPERIOR, WISCONSIN, ASSIGNOR OF ONE-EIGHTH TO JOHN J. SULLIVAN, OF DULUTH, MINNESOTA.

LOAD RETAINING OR RELEASING MEANS FOR VEHICLES.

SPECIFICATION forming part of Letters Patent No. 736,269, dated August 11, 1903.

Application filed September 11, 1902. Serial No. 122,919. (No model.)

*To all whom it may concern:*

Be it known that I, EPHRIAM H. B. KNOWLTON, a citizen of the United States, residing at Superior, in the county of Douglas and State of Wisconsin, have invented certain new and useful Improvements in Load Retaining or Releasing Means for Vehicles; and I do hereby declare the following to be a full, clear, and exact description of the invention, such as will enable others skilled in the art to which it appertains to make and use the same.

My invention relates to load retaining and releasing means for vehicles, and has for its object the provision of means by which the load can be released by an operator standing near the vehicle at a point of safety from the debarking load.

It consists, in combination with the frame of the vehicle, of a bracket extending therefrom, a stake mounted thereon, means secured to said bracket adapted to engage the stake in operative position, and governing means for operating said engaging means.

It also consists of certain other constructions, combinations, and arrangements of parts, as will be hereinafter described and claimed.

In the drawings, Figure 1 is a front elevation of my said invention. Fig. 2 is a detail side elevation of a hook forming part of my said invention. Fig. 3 is a detail side elevation of a cam, showing in cross-section the shaft upon which it is mounted. Fig. 4 is a side elevation of my said invention.

In the drawings, 1 is the bolster of a car or other vehicle, to which is attached the bracket 2, adapted to support a stake 3, forked at its lower end and journaled astride said bracket upon a shaft 4, which is journaled in notches 5, cut in the forward edges of the forwardly-projecting plates forming said bracket and adapted to fall from said notches when the upper end of said stake swings forward and downward to release the load. The foot of each leg of said stake is notched, as at 6, and normally rests upon a shaft 7, engaged by said notches in said stake and projected through the side walls of said bracket, near the lower edge thereof, said feet being adapted to disengage from said shaft when the upper portion of the stake swings backward and downward toward the car, as hereinafter explained. Shoes 8 are formed upon or secured to each of the side walls of said bracket beneath the feet of said stake and are adapted to prevent the disengagement of said feet from said shaft 7 when the top of said stake swings forward and downward. Between the side walls of said bracket and upon said shaft 4 is keyed or otherwise rigidly secured a cam 9, adapted to be engaged by a hook or parallel hooks 10, journaled upon a shaft 11, projected through the side walls of said bracket. Said shaft 4 is preferably reduced at one end outside of the stake and threaded and a retaining-nut secured thereon. A crank-arm 12 is also screwed upon such reduced end, preferably in such manner as to operate as a jam-nut, which arm is adapted to engage a cam 13, rigidly secured to a shaft 14, journaled in said bracket or in the frame of said vehicle, as may be suitable and desired. Said cam 13 is also preferably formed with a short arm 15, adapted to engage said arm 12 to prevent the revolution of the same. An operating-lever 16 is secured to said shaft 14 and is preferably flattened and apertured at the free end to receive the bolt of a padlock 18 or other suitable locking means by which it may be secured to a pivotal arm 17, pivoted to said frame and apertured at its free end and adapted to overlap the free end of said lever 16 and to receive the bolt of said padlock for securing the free ends of said lever 16 and said arm 17 together to prevent the rotation of said lever 16. For further securing said load a load-wrapper chain may be brought downward over the upper end of said stake between forwardly-projecting lugs 20, formed thereon, and the terminal hook 21 of said chain caught under said cam 9.

The operation of my invention is as follows: The stake being vertical and the cam 9 being turned downward and backward and engaged by the hooks 10 and the cam 13 being locked in position supporting the lever 12 against revolution, the vehicle is ready to receive the load, which being embarked the wrapper-chain is preferably passed over it and the terminal hook 21 caught under the cam 9. To disembark the load, the lever 16 is unlocked and moved radially upward, causing the long arm of the cam 13 to press the lever 12 radially downward, thus rotating the cam 9, which raises the hooks 10 out of engagement and at the same time pushes the hook 21 outwardly, thus freeing said chain. The pressure of the load now forces said stake radially outward and downward, said stake pivoting on said shaft 7 and carrying with it said shaft 4 and the parts connected thereto, the load following. If it is desired to lower the stake to pass empty through log-loading machines, it may be dropped back upon the empty car until the top of the forked portion rests upon the bolster or other obstacle, said stake in such event pivoting in said notches 5 and disengaging from said shaft 7. Care may be exercised in such last event to prevent said stake from total disengagement from said bracket until the head of the fork engages the bolster, at which time the leverage will keep said shaft 4 from slipping from said notches 5. It is obvious that said shaft 14 may extend to the opposite end of the car and there support means for controlling another similar stake contiguous thereto. It is also obvious that said locking means is susceptible of minor changes and modifications within the scope of my invention and that said stake may be modified, buttressed, or otherwise strengthened without departing from the spirit of my invention.

Having now described my invention, what I claim, and desire to secure by Letters Patent, is—

1. In load retaining and releasing means, the combination with a load-supporting structure, of a bracket secured thereto, a stake, forked at its lower end, mounted upon said bracket, a cam positioned between the legs of said fork and rigidly secured to a shaft journaled in bearings formed by the legs of said fork, means journaled to said bracket for engaging said cam when said stake and cam are in operative position, and means for operating said cam to disengage said engaging means, substantially as described.

2. In means for the purposes described, the combination with a load-supporting structure of a bracket secured thereto and formed with forwardly-projecting side walls having notches formed therein, a stake forked at its lower end and journaled astride of said bracket upon a shaft projecting through the notched portions of said walls, a cam rigidly secured to said shaft between the said side walls, a hook journaled in said bracket and adapted to engage said cam in operative position, means for operating said cam, and governing means for controlling said operating means, substantially as described.

3. In means for the purposes described, the combination with a load-supporting structure of a bracket secured thereto and formed with forwardly-extending side walls having notches formed in their forward edges, a stake, forked at its lower end, journaled astride of said bracket upon a shaft adapted to project through the notched portions of said side walls, said stake having notches formed in the rear edges of each foot of said forked portion, adapted to engage a second shaft projected through the side walls of said bracket, means for retaining said stake in a vertical position, means for releasing the same from such position and means for maintaining the engagement of the notched portions of said stake with said second shaft when said stake is released from the first-said retaining means, substantially as described.

4. In means for the purposes described, the combination with a load-bearing structure of a bracket secured thereto and formed with forwardly-projecting side walls having notches formed in their forward edges, a stake forked at its lower end journaled astride of said bracket upon a shaft projected through the notches of said side walls, said stake having notches formed in the rear edges of each foot of said forked portion adapted to engage a second shaft projected through the side walls of said bracket, a shoe formed upon the outer faces of said side walls and adapted to maintain the engagement of the notched portions of said stake with said second shaft when said stake is radially lowered forward, a cam secured to the first-said shaft between the side walls of said bracket, a hook, or hooks, journaled upon a third shaft projected through said bracket to the rear of the first-said shaft and adapted in operative position to engage said cam, a crank-lever secured to one of the outer ends of the first-said shaft, a second cam secured to a fourth shaft projected through said bracket and adapted to engage said crank-arm, a lever for operating said second cam, and means for locking the last-said lever substantially as described.

In testimony whereof I hereunto affix my signature in presence of two witnesses.

EPHRIAM H. B. KNOWLTON.

In presence of—
H. A. WING,
JAMES T. WATSON.